United States Patent
Lau

(10) Patent No.: US 9,656,207 B2
(45) Date of Patent: May 23, 2017

(54) SELECTIVE CATALYTIC $NO_x$ REDUCTION APPARATUS PROVIDING IMPROVED GASIFICATION OF UREA

(71) Applicant: Fuel Tech, Inc., Warrenville, IL (US)

(72) Inventor: Ronald A. Lau, North Aurora, IL (US)

(73) Assignee: FUEL TECH, INC., Warrenville, IL (US)

( * ) Notice: Subject to any disclaimer, the term of this patent is extended or adjusted under 35 U.S.C. 154(b) by 10 days.

(21) Appl. No.: 14/937,666

(22) Filed: Nov. 10, 2015

(65) Prior Publication Data

US 2016/0129396 A1    May 12, 2016

Related U.S. Application Data

(60) Provisional application No. 62/077,377, filed on Nov. 10, 2014.

(51) Int. Cl.
| | | |
|---|---|---|
| *B01F 5/04* | (2006.01) | |
| *B01D 53/90* | (2006.01) | |
| *B01F 5/06* | (2006.01) | |
| *B01F 3/04* | (2006.01) | |

(52) U.S. Cl.
CPC .......... *B01D 53/90* (2013.01); *B01F 3/04049* (2013.01); *B01F 5/0451* (2013.01); *B01F 5/0618* (2013.01); *B01D 2251/2067* (2013.01); *B01F 2005/0637* (2013.01); *B01F 2005/0639* (2013.01)

(58) Field of Classification Search
CPC .. B01F 3/04049; B01F 5/0451; B01F 5/0618; B01F 2005/0637; B01F 2005/0639; B01D 53/90; B01D 2251/2067

USPC ........................................................ 261/79.2
See application file for complete search history.

(56) References Cited

U.S. PATENT DOCUMENTS 3,363,403 A * 1/1968 Vicard ................. A01G 25/095
                                                            261/116
3,406,953 A * 10/1968 Moore .................... B01D 47/10
                                                            261/116

(Continued)

*Primary Examiner* — Charles Bushey
(74) *Attorney, Agent, or Firm* — Thaddius J. Carvis

(57) ABSTRACT

Disclosed is an apparatus for gasifying urea from aqueous solution, comprising: a vertically-oriented gasification chamber. A gas inlet opening permits entry of hot gases from the top and a gas outlet opening for permitting the removal of gases including gasified urea from the bottom. Sidewalls define a gasification chamber communicating with the gas inlet and gas outlet. The sidewalls include, an injector support section having a generally cylindrical side wall, at least one injector for introducing fine droplets of aqueous urea parallel to the central vertical axis, and a gas swirling device including a frame and a plurality of vanes for downwardly spiraling gases passing through it from top to bottom. Also, defined by the sidewalls are a conical midsection is provided with an outwardly expanding diameter from top to bottom, and a conical collection section with inwardly decreasing diameter from top to bottom. The apparatus is arranged such that aqueous urea is introduced into a downwardly spiraling flow of hot gases that prevents droplets from contacting chamber sidewalls until gasification is complete.

10 Claims, 2 Drawing Sheets

(56) References Cited

U.S. PATENT DOCUMENTS

| | | | | |
|---|---|---|---|---|
| 4,695,298 A | * | 9/1987 | Dries | B01D 47/10 |
| | | | | 261/22 |
| 4,970,030 A | * | 11/1990 | Prudhon | B01D 1/14 |
| | | | | 261/116 |
| 6,149,715 A | * | 11/2000 | Keinanen | B01D 45/16 |
| | | | | 261/79.2 |
| 7,090,810 B2 | * | 8/2006 | Sun | B01D 53/8631 |
| | | | | 423/235 |
| 2002/0014707 A1 | * | 2/2002 | Zamany | B01D 51/10 |
| | | | | 261/79.2 |

* cited by examiner (Detail of A)

SELECTIVE CATALYTIC NO$_x$ REDUCTION APPARATUS PROVIDING IMPROVED GASIFICATION OF UREA

PRIORITY CLAIM

This application hereby claims priority to U.S. Provisional Patent Application Ser. No. 62/077377, filed Nov. 10, 2014, entitled "Selective Catalytic NO$_x$ Reduction Apparatus Providing Improved Gasification". The entire disclosure of which is hereby incorporated in its entirety.

FIELD OF THE INVENTION

The invention relates to an apparatus for efficiently gasifying urea for selective catalytic reduction (SCR) of NO by feeding urea to a chamber designed to completely gasify the urea to feed NO$_x$-reductant gas to an SCR unit.

BACKGROUND OF THE INVENTION

SCR has been proven to be highly effective at NO$_x$ reduction, and SCR units can generally be scaled to the size required. However, SCR units typically require the use of ammonia as a reducing reagent, and it is a common problem that ammonia is difficult and dangerous to store, especially in populated areas. Thus, the use of urea and ammonia generators such as described in U.S. Pat. No. 7,090,810 to Sun, et al., are often effective, but these devices can be troubled by issues related to injector bearding and deposits caused by conditions at the injector, incorrect installation, and nozzle damage.

Injector bearding can be caused when small droplets of aqueous urea drift upwards, carried by small scale local flow recirculation near the nozzle. They can then contact the surface of the injector and, over time, form deposits that often give a beard-like appearance. This type of injector deposit will not usually grow large enough to create large deposits elsewhere in the chamber. They become localized to near the nozzle, sometimes forming a thin crust on the underside of the injector body near the nozzle, or a conical 'bugle' or 'beehive' shape just behind the nozzle. However, there have been situations where the deposits on the injectors continued to grow.

Injector beards that continue to grow can interfere with the injector spray, diverting some droplets and causing them to combine with others into very large droplets. Dripping solution can then cause deposits to form on the chamber walls or exit pipe. The deposits could continue to grow until the chamber would no longer function.

When urea gasification for SCR or other like commercial units is needed, effective operation without fouling of equipment requires uniform distribution and rapid pyrolysis and/or hydrolysis. A proper velocity distribution of hot air before and after introduction of urea is critical for the operation of such a gasification chamber. While the concept of a perforated plate has been suggested to provide uniform flow prior to urea injection to provide a desirable gas pattern for urea distribution, in practice these devices have a limited capacity and, if not specially modeled and constructed, can cause improper reagent back flow or recirculation which can result in solid urea encrusting on the plate, chamber walls or near the nozzle, causing fouling and related problems. It would be desirable to avoid fouling, especially on the nozzle.

There is a particular need for such an apparatus which can convert urea to gaseous form without equipment fouling or excessive reagent usage or loss of pollution control effectiveness.

SUMMARY OF THE INVENTION

The present invention provides an apparatus for gasifying urea for reducing the concentration of nitrogen oxides in combustion gases.

In one aspect, the invention provides an apparatus for gasifying urea from aqueous solution, comprising: a vertically-oriented gasification chamber which is symmetrical around a central vertical axis, the chamber having a gas inlet opening permitting entry of hot gases from the top of the apparatus, a gas outlet opening for permitting the removal of gases including gasified urea from the bottom of the apparatus, and sidewalls defining a gasification chamber communicating with said gas inlet and said gas outlet; wherein the sidewalls include, an injector support section having a generally cylindrical side wall, at least one injector for introducing fine droplets of aqueous urea parallel to the central vertical axis, and a gas swirling device including a frame and a plurality of vanes for downwardly spiraling gases passing through it from top to bottom, a conical midsection with outwardly expanding diameter from top to bottom along the central vertical axis, and a conical collection section with inwardly decreasing diameter from top to bottom along the central vertical axis; the apparatus being arranged such that aqueous urea is introduced into a downwardly spiraling flow of hot gases that prevents droplets from contacting chamber sidewalls until gasification is complete.

In another aspect of the invention, the gas inlet opening is of similar size to the gas outlet opening.

It is another feature of some embodiments that the vanes for downwardly spiraling gases extend radially from the central vertical axis and are oriented at an angle of less than 25° to the vertical, from top to bottom, e.g., at an angle of about 15° to the vertical, from top to bottom.

In embodiments, the height of conical midsection is from 2 to 6 times the height of the collection section as measured along the central vertical axis, e.g., at least 4 times the height of the collection section as measured along the central vertical axis.

In embodiments, the diameter of a cross section of the conical midsection at the top is at least 3 times height of the diameter of a cross section of the conical midsection at a juncture with the collection section, e.g., from 4 to 6 times height of the diameter of a cross section of the conical midsection at a juncture with the collection section.

In some embodiments, the lower extremity of the injector is positioned above the lower flange of the injector support section.

In embodiments, the injector support section has an upper flange and a lower flange, the upper flange is mated with a complimentary flange below the gas inlet and the lower flange is mated with a flange on the conical midsection, each mating being effected by a plurality of bolts such that removal of all but two vertically-aligned bolts permits the injector support section to be pivoted into and out of service position to permit inspection of the injector.

Other and preferred aspects of the invention are described below.

DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention. As shown throughout the drawings, like reference numerals designate like or corresponding parts.

DETAILED DESCRIPTION OF THE INVENTION

The apparatus of the invention takes the disclosure of U.S. Pat. No. 7,090,810 as background, and the disclosure of that patent is incorporated herein in its entirety as if fully repeated herein.

The term "urea" is meant to include the reagents that are equivalent to urea in the sense that they form at least ammonia when heated, whether or not they contain large amounts of the pure chemical urea in the form introduced; however, the reagents that are equivalent to urea typically contain measurable quantities of urea in their commercial forms and thus comprise urea. Among the $NO_x$-reducing reagents that can be gasified are those that comprise a member selected from the group consisting of: ammelide; ammeline; ammonium carbonate; ammonium bicarbonate; ammonium carbamate; ammonium cyanate; ammonium salts of inorganic acids, including sulfuric acid and phosphoric acid; ammonium salts of organic acids, including formic and acetic acid; biuret; triuret, cyanuric acid; isocyanic acid; urea formaldehyde; melamine; tricyanourea and mixtures of any number of these. Yet other $NO_x$-reducing reagents are available that do not form HNCO as urea itself does, but decompose to a mixture of gases including hydrocarbons. Among this group are various amines and their salts (especially their carbonates), including guanidine, guanidine carbonate, methyl amine carbonate, ethyl amine carbonate, dimethyl amine carbonate, hexamethylamine; hexamethylamine carbonate; and byproduct wastes containing urea from a chemical process. Amines with higher alkyls can be employed to the extent that the hydrocarbon components released do not interfere with the $NO_x$-reduction reaction.

The term "urea" is thus meant to encompass urea in all of its commercial and equivalent forms. Typically, commercial forms of urea will consist essentially of urea, containing 95% or more urea by weight. This relatively pure form of urea is preferred and has several advantages in the process of the invention. It is preferably supplied to the process as an aqueous solution at a concentration of from about 5 to about 70%, with about 30 to about 60% being most typical. When certain of these urea equivalents are gasified, the reactant gas will also contain HNCO which can react with water to convert to ammonia and carbon dioxide. It is an advantage of the invention that this can be easily achieved without prehydrolysis of the $NO_x$-reducing reagent which has the attendant risk of plugging nozzles and other equipment.

By the term "gasification" we mean that substantially all of the urea is converted into a gas, leaving no significant dissolved or free solids or liquid to contact the SCR catalyst.

Figures 1, 2, 3:
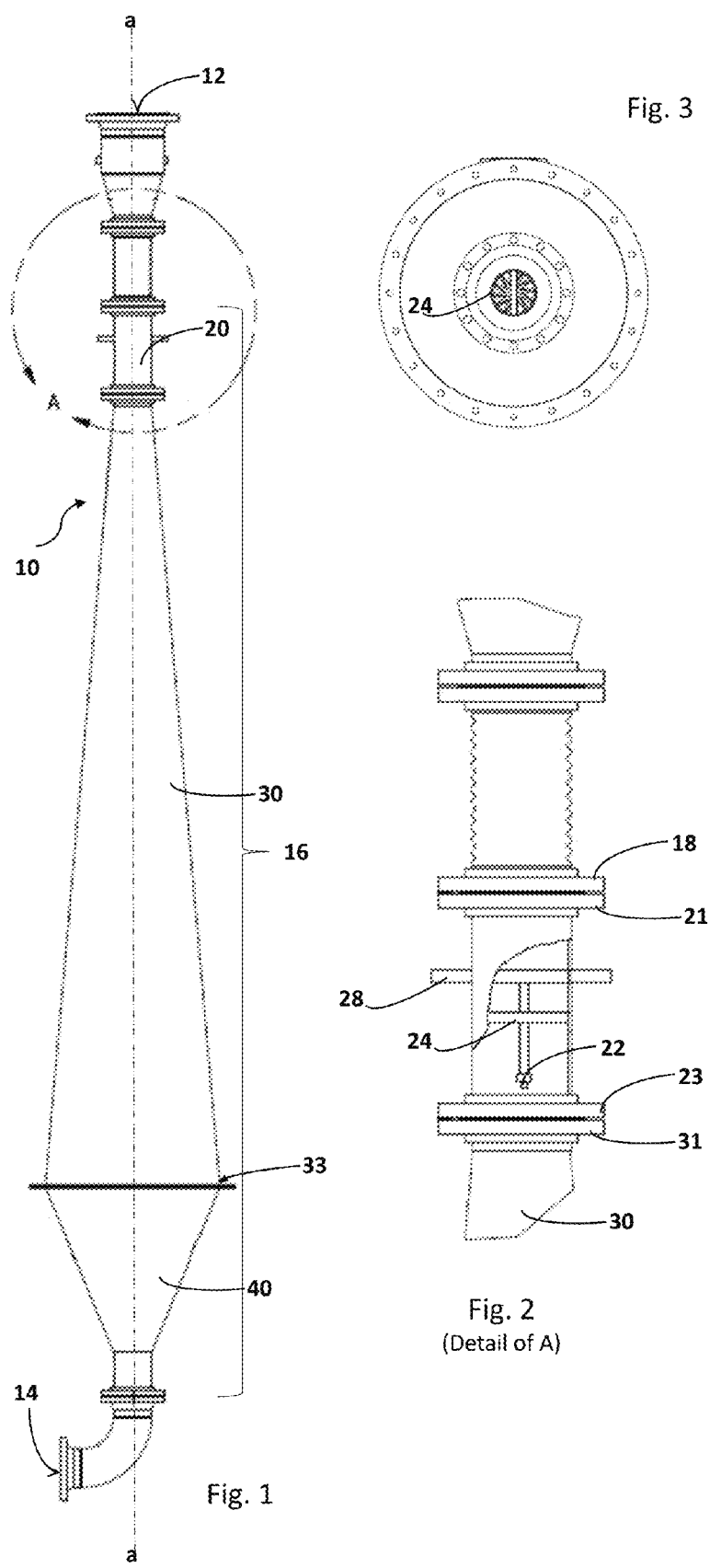
FIG. 1 is a schematic side elevation of a preferred embodiment of the invention.
FIG. 2 is a side elevation, partially cut away, of detail of the apparatus from area A as shown in FIG. 1
FIG. 3 is a schematic top plan view of an apparatus shown in FIG. 1.

With reference to FIG. 1, there is shown a urea gasification apparatus 10 which is symmetrical around a central vertical axis a-a, the apparatus having a gas inlet 12 opening permitting entry of hot gases from the top of the apparatus, a gas outlet opening 14 for permitting the removal of gases including gasified urea from the bottom of the apparatus, and sidewalls 16 (the parts bracketed in FIG. 1) defining a gasification chamber and communicating with said gas inlet 12 and said gas outlet 14. The gases are preferably introduced into the apparatus 10 at a temperature of from about 600° F. to about 1300° F., e.g., from about 700° F. to about 1200° F. The temperature of the gases and the residence time, e.g., from about 1 to 10 seconds, prior to exit via gas outlet 14 will be effective to achieve full gasification. The entry temperature of the gases should be high enough also to maintain an exit temperature of at least about 550° F. and preferably at least 600° F.

Figure 4:
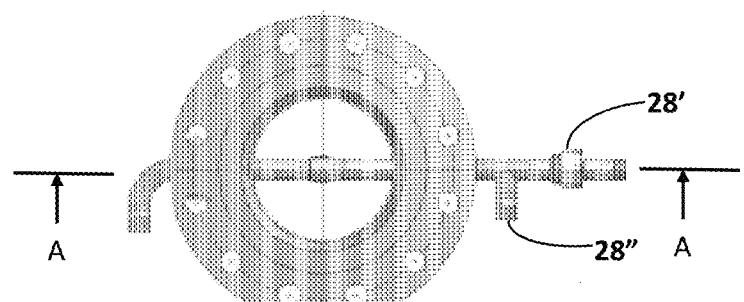
FIG. 4 is a top plan view of an injector support section showing an injector with feed lines.

The sidewalls include an injector support section 20 having a generally cylindrical side wall, at least one injector 22 (seen best in FIG. 2) for introducing fine droplets of aqueous urea parallel to the central vertical axis, and a gas swirling device 24 including a frame 25 and a plurality of vanes 26 (seen best in FIG. 4) for downwardly spiraling gases passing through it from top to bottom. The vanes 26 for downwardly spiraling gases extend radially from the central vertical axis and are oriented at an angle of less than 25° to the vertical, from top to bottom, e.g., at an angle of about 15° to the vertical, from top to bottom.

The low angle of the gas swirling device 24, comprised of frame 25 and blades 26, can produce the best results with no observable flow recirculation anywhere in the chamber from the beginning of the expansion to the chamber exit. The gas swirling device 24 causes a gentle spiral movement of the incoming gases which tends to move very fine droplets away from the chamber walls without disturbing the flow of larger droplets, which have significant momentum. In this manner, it is virtually assured that complete gasification of the aqueous urea solution is achieved before any droplets are able to contact chamber walls.

Figure 5:
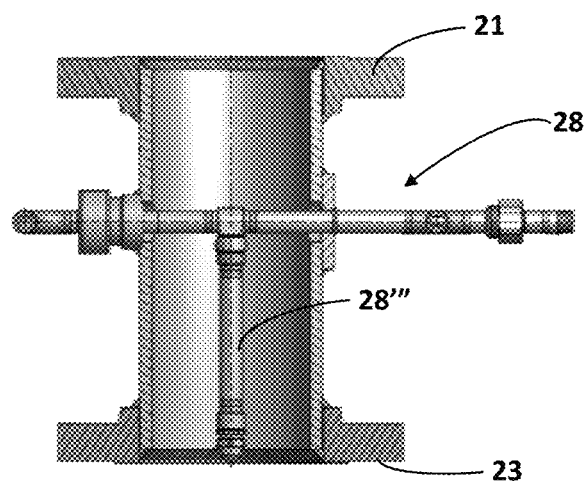
FIG. 5 is a side elevation sectional view taken along line 5-5 in FIG. 4. of an injector support section showing an injector with feed lines.
Figure 6:
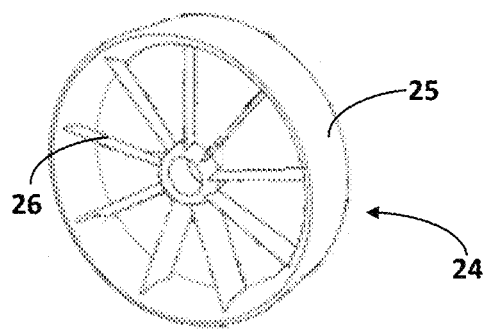
FIG. 6 is a perspective view showing a gas swirling device as employed in the apparatus of the invention.

The vanes 26 are preferably essentially flat but can have a slight curve, with the noted angle being the average angle, when curved. Piping element 28 provides feed of aqueous urea and atomizing air, as can be seen in greater detail in FIG. 4 and FIG. 5, where 28' is a feed line for urea and 28" is a feed line for atomizing air and both are supplied to injector 22 via piping element 28'''.

The aqueous urea is preferably atomized with an internal-mix, air-atomized injector nozzle. It can be single or multiple-hole depending on desired flow rates and specific nozzle choice. The spray from the nozzle should form a narrow, conical pattern that can form small droplets with good momentum to eliminate coalescence of smaller droplets into larger ones.

The droplet sizes should be from about 10 to about 120μ in diameter. The pressure of the fluid and atomizing air at the nozzle and the flow rates will be adjusted as necessary to meet these requirements. The nozzle is ideally located in a pivotable injector unit located near the inlet of the chamber where the internal diameter is the smallest. In embodiments, the gas velocity at the injector will be at the maximum and can be on the order of about 50 feet per second.

The injector 22 will typically introduce from about 5 to about 50 pounds per hour (pph) of urea (dry) for gasification. For a 50% urea solution, 0.34 gallons per minute (gpm) can produce approximately 50 pph of product gases. Up to about 1200 pph are contemplated. The injector 22 is placed where the process air velocity is highest, and the injector droplets are moving fast at the nozzle exit. Droplets either evaporate or are re-directed and entrained in the flow before impacting the walls of the chamber. By placing the injector at the where the process air has the highest velocity, the injector can be made co-axial with greater than 50 feet per second (ft/sec) process air. This can both reduce the size of local flow recirculation at the nozzle and increase the temperatures near the nozzle and on the nozzle surface, thus eliminating the two main causes of injector bearding. Initially following injection of the aqueous urea, the droplets have high momentum with paths that are determined by injection pressures and are independent of process air flow. Then, as the droplets are gasified by the hot gases there is an onset of rapid spray diffusion. At this stage, within a conical midsection 30 and prior to entry into a collection section 40, the atomizing momentum will have dissipated and the droplets will have lost individual momentum relative to process flow and become dependent on process air flow.

There is little risk of direct droplet impingement on the chamber walls near the injector nozzle, where direct impingement is defined as droplets exiting the nozzle impacting the wall before losing their initial momentum. Droplets with an initial velocity angle that intersects the expanding walls will either evaporate completely or be re-directed by the flow before impacting the wall.

In embodiments, the injector support section 20 has an upper flange 21 and a lower flange 23. The upper flange 21 is mated with a complimentary flange 18 below the gas inlet, and the lower flange 23 is mated with a flange 31 on a conical midsection 30. Each mating of these flanges is effected by a plurality of bolts (not shown) such that removal of all but two vertically-aligned bolts permits the injector support section 20 to be pivoted into and out of service position to permit inspection of the injector 22.

A conical midsection 30 has an outwardly-expanding diameter from top to bottom along the central vertical axis a-a. Fixed to the lower end of the conical midsection 30 is a conical collection section 40 which has an inwardly-decreasing diameter from top to bottom along the central vertical axis a-a. In another aspect of the invention, the gas inlet to injector support section 20 is of similar size to the gas outlet from a conical collection section 40.

In embodiments, the height of conical midsection 30 is from 2 to 6 times the height of the collection section 40 as measured along the central vertical axis, e.g., at least 4 times the height of the collection section 40 as measured along the central vertical axis.

In embodiments, the diameter of a cross section of the conical midsection 30 at the top is at least 3 times that of the diameter of a cross section of the conical midsection at a juncture with the collection section 40, e.g., from 4 to 6 times the diameter of a cross section of the conical midsection 30 at a juncture with the collection section 40.

The apparatus configured of these structures as described is arranged such that finely atomized aqueous urea is introduced via injector 22 into a downwardly spiraling flow of hot gases that prevents droplets from contacting the chamber sidewall until gasification is complete.

In embodiments, the injector support section has an upper flange and a lower flange, the upper flange is mated with a complimentary flange on the gas inlet and the lower flange is mated with a flange on the conical midsection, each mating being effected by a plurality of bolts such that removal of all but two vertically-aligned bolts permits the injector support section to be pivoted into and out of service position to permit inspection of the injector.

In some embodiments, the lower extremity of the injector is positioned above the lower flange of the injector support section.

Preferably, the apparatus is employed in combination with a catalyst for selective catalytic $NO_x$ reduction, for selective noncatalytic NO reduction and for other purposes such as flue gas conditioning, and the like.

The above description is for the purpose of teaching the person of ordinary skill in the art how to practice the invention. It is not intended to detail all of those obvious modifications and variations, which will become apparent to the skilled worker upon reading the description. It is intended, however, that all such obvious modifications and variations be included within the scope of the invention which is defined by the following claims. The claims are meant to cover the claimed components and steps in any sequence which is effective to meet the objectives there intended, unless the context specifically indicates the contrary.

What is claimed is:

1. An apparatus is provided comprising:
   a. a vertically-oriented gasification chamber being symmetrical around a central vertical axis, the chamber having
      i. a gas inlet opening permitting entry of hot gases from the top of the apparatus,
      ii. a gas outlet opening for permitting the removal of gases including gasified urea from the bottom of the apparatus, and
      iii. sidewalls defining a gasification chamber communicating with said gas inlet and said gas outlet, wherein the sidewalls include,
         (a) an injector support section having a generally cylindrical side wall, at least one injector for introducing fine droplets of aqueous urea parallel to the central vertical axis, and a gas swirling device including a frame and a plurality of vanes for downwardly spiraling gases passing through it from top to bottom,
         (b) a conical midsection with outwardly expanding diameter from top to bottom along the central vertical axis, and
         (c) a conical collection section with inwardly decreasing diameter from top to bottom along the central vertical axis;
   the apparatus being arranged such that aqueous urea is introduced into a downwardly spiraling flow of hot gases that prevents droplets from contacting chamber sidewalls until gasification is complete.

2. An apparatus according to claim 1, wherein the gas inlet opening is of similar size to the gas outlet opening.

3. An apparatus according to claim 1, wherein said vanes for downwardly spiraling gases extend radially from the central vertical axis and are oriented at an angle of less than 25° to the vertical, from top to bottom.

4. An apparatus according to claim 3, wherein said vanes for downwardly spiraling gases extend radially from the central vertical axis and are oriented at an angle of about 15° to the vertical, from top to bottom.

5. An apparatus according to claim 1, wherein the height of conical midsection is from 2 to 6 times the height of the collection section as measured along the central vertical axis.

6. An apparatus according to claim 5, wherein the height of the conical midsection is at least 4 times the height of the collection section as measured along the central vertical axis.

7. An apparatus according to claim 1, wherein the diameter of a cross section of the conical midsection at the top is at least 3 times height of the diameter of a cross section of the conical midsection at a juncture with the collection section.

8. An apparatus according to claim 1, wherein the diameter of a cross section of the conical midsection at the top is from 4 to 6 times the diameter of a cross section of the conical midsection at a juncture with the collection section.

9. An apparatus according to claim 1, wherein the lower extremity of the injector is positioned above the lower flange of the injector support section.

10. An apparatus according to claim 1, wherein injector support section has an upper flange and a lower flange, the upper flange is mated with a complimentary flange below the gas inlet and the lower flange is mated with a flange on the conical midsection, each mating being effected by a plurality of bolts such that removal of all but two vertically-aligned bolts permits the injector support section to be pivoted into and out of service position to permit inspection of the injector.

* * * * *